Dec. 10, 1963   W. M. BROWN   3,113,768
SPRING-END MOUNTING
Filed Oct. 12, 1961
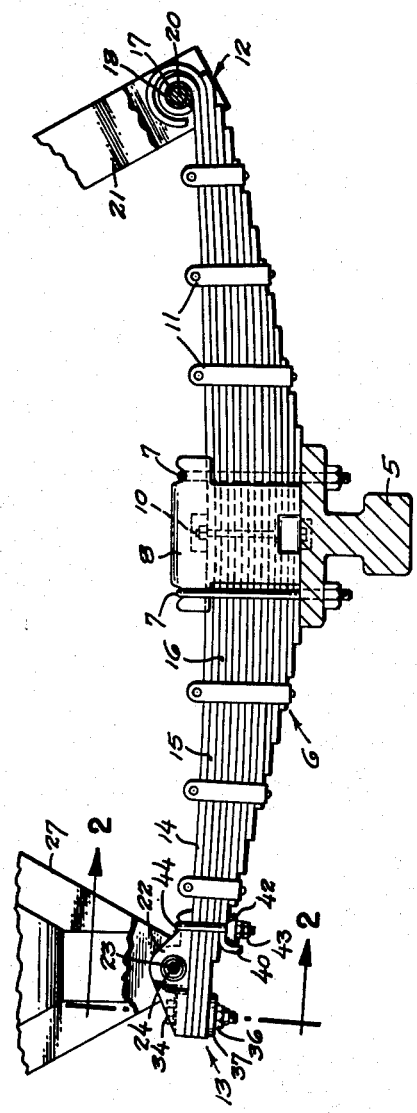
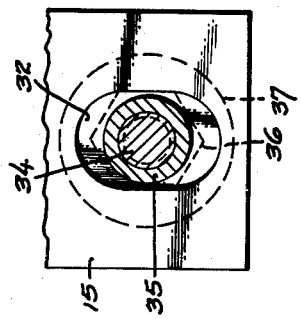
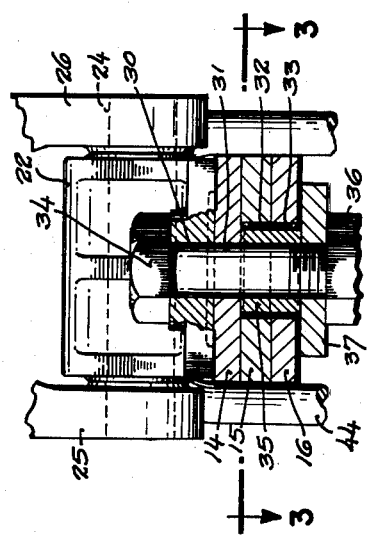
INVENTOR.
WALLACE M. BROWN
BY
ATTORNEYS 3,113,768
SPRING-END MOUNTING
Wallace M. Brown, Seattle, Wash., assignor to Pacific Car and Foundry Company, Seattle, Wash., a corporation of Washington
Filed Oct. 12, 1961, Ser. No. 144,745
1 Claim. (Cl. 267—54)

This invention relates to a suspension for springing the frame of a truck or trailer from an axle, being that type of suspension in which the springing agent is comprised of a bound stack of spring leaves anchored at its center to the axle, and having frame mountings for the two spring ends. One such spring-end mounting is localized with respect to the vehicle frame. The other spring-end mounting is permitted to shift longitudinally relative to the frame.

Where required to handle the heavy loads to which trucks and trailers are subject, the tongue which is provided at each of the two ends of the spring stack is composed of several leaves. In compensation of the flexing to which the spring stack is subject, the several leaves in each tongue must admit to relative endwise motion. Spring-end mountings accordingly bolt or otherwise firmly secure only one of the component leaves. The problem is one of designing the mounting in a manner which will best insure that the single-leaf attachment will hold secure, with minimum liability that the spring end will fail upon subjection to severe or prolonged stressing.

The present invention has for its object to provide, in a spring suspension of the described heavy-duty nature, a perfected mounting for the localized end of the spring-pile. This and other more particular objects and advantages will appear and be understood in the following description and claim, the invention consisting in the novel construction and in the adaptation and combination of parts hereinafter described and claimed.

In the accompanying drawing:

FIGURE 1 is a fragmentary side elevational view, with parts in longitudinal vertical section, illustrating a multiple-leaf spring suspension embodying teachings of the present invention.

FIG. 2 is a fragmentary transverse vertical sectional view drawn to an enlarged scale on line 2—2 of FIG. 1; and FIG. 3 is a fragmentary horizontal section view on line 3—3 of FIG. 2.

The stack of spring leaves, as here illustrated, is shown applied to a vehicle's front axle, said axle being designated by the numeral 5. The pile 6 of bound spring leaves seats at its mid-length upon said axle and is made secure thereto by the usual U-bolts 7 exerting clamping pressure upon a cap-piece 8. The several leaves in the pile are secured one to another at a point central to their length by a vertical bolt 10, and are gripped by the usual clips 11. These clips function only to hold the leaves against disarrangement and perforce admit the moderate degree of relative endwise motion which takes place by flexure of the two ends of the spring stack. A multiplicity of the uppermost spring leaves extend substantially the full length of the stack at each of the two extremities so as to give necessary strength to the terminal mounting tongues. The stack is here shown as having its terminal tongues 12 and 13 composed of three leaves, designated by 14, 15 and 16.

The connection between the vehicle frame (not shown) and the stack's front-end tongue 12 is or may be a conventional mounting in which the uppermost leaf is curled back upon itself to produce a terminal eye 17. A bushing 18 is press-fitted in the eye. A pin 20 is received through this bushing to pivotally connect the tongue to a frame-carried swing-shackle 21.

The rear end of the spring stack is surmounted by a cast block 22. At its approximate mid-length the block is pierced transversely to provide a horizontal eye, and press-fitted in this eye is bushing 23 for a mounting pin 24. The mounting pin pivotally connects the block between pendant fork arms 25—26 of a bracket 27 rigidly bolted to the vehicle frame.

Spaced to the rear of said eye the block is provided centrally of its width with a vertical bolt-hole 30. This bolt-hole registers with respective holes, as 31, 32 and 33, which pierce the lamanae composing the spring stack's terminal tongue 13. The hole 31 is made circular with its diameter exactly corresponding to that of the hole 30. Each of the holes 32 and 33 are elongated, with the minor axis lying transverse to the spring leaves, and the width across such minor axis is considerably greater than said diameter of the hole 31, being here shown as approximately twice such diameter.

In securing the tongue to such block a headed bolt 34 of a diameter corresponding to that of the holes 30 and 31 is inserted from above through said holes 30 and 31 and the underlying elongated holes 32 and 33. A hardened spacer sleeve 35 moderately longer than the combined thickness of the two leaves 14 and 15 and with an O.D. giving clearance relative to the side walls of the holes 32 and 33 is inserted from below onto the bolt. A nut 36 acts by an intervening washer 37 to exert pressure through such spacer sleeve onto the uppermost spring leaf 13 so as to squeeze the latter against the underside of the block.

The two leaves 14 and 15 are free to slip one relative to the other upon flexure of the stack, while securely anchoring the uppermost leaf 14 by the squeeze pressure—widely distributed over the meeting surfaces of the block 22 and leaf 14—obtained from the spacer sleeve 35. It is to be particularly noted that there is no weakening of the anchoring leaf such, for example, as occurs when the same is deformed to provide a terminal hook. In the present assembly, a leaf of the stack located below the tongue in lapping relation thereto has a downturned lip end 40 which serves a safety hooking function in the unlikely event of the bolt 34 becoming sheared. Complementary to said lip is a rock-plate 42 caught by nut and jam-nut combinations 43 applied to the ends of a U-bolt 44 which saddles the front end of the block.

It is believed that the invention will have been clearly understood from the foregoing detailed description of my now-preferred illustrated embodiment. Changes in the details of construction may be resorted to without departing from the spirit of the invention, and it is accordingly my intention that no limitations be implied and that the hereto annexed claim be given the broadest interpretation to which the employed language fairly admits.

What I claim is:

In a vehicle suspension employing as the primary springing agent a spring beam composed of multiple spring leaves bound in a pile and having at least two of said leaves protuding at the end as a laminated tongue prolongation, said two component leaves of the tongue being pierced with a respective one of two vertical registering holes one circular and the other oblong and adapted to function the former as an anchoring leaf and the latter as a floating leaf, said oblong hole being placed so that its major axis lies on the longitudinal median line of the tongue and having a width across its minor axis substantially greater than the diameter of the circular hole, a mounting block seating against said anchoring leaf, providing a transverse horizontal eye to receive a mounting pivot pin and having a vertical hole piercing the same in a position longitudinally offset from the eye, said vertical hole of the block exactly registering with said circular hole of the anchoring leaf, and a bolt fitting said registering circular holes having a head at one end and a nut at the other end acting together with a thrust-transmitting sleeve to squeeze the block against the contiguous leaf, the sleeve having a tolerance fit in said oblong hole and having a length greater than the thickness of the floating leaf.

References Cited in the file of this patent

UNITED STATES PATENTS

| | | |
|---|---|---|
| 1,613,700 | Geistert | Jan. 11, 1927 |
| 1,631,228 | Short | June 7, 1927 |
| 1,829,163 | Sprong | Oct. 27, 1931 |
| 1,941,331 | Veale | Dec. 26, 1933 |

FOREIGN PATENTS

| | | |
|---|---|---|
| 313,897 | Italy | Jan. 11, 1934 |
| 479,343 | Great Britain | Feb. 3, 1938 |